(12) United States Patent
Garg

(10) Patent No.: US 7,565,366 B2
(45) Date of Patent: Jul. 21, 2009

(54) VARIABLE RATE SAMPLING FOR SEQUENCE ANALYSIS

(75) Inventor: Neeraj Garg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 11/300,036

(22) Filed: Dec. 14, 2005

(65) Prior Publication Data

US 2007/0136339 A1    Jun. 14, 2007

(51) Int. Cl.
G06F 7/00 (2006.01)
(52) U.S. Cl. ..................................... 707/101
(58) Field of Classification Search ................ 707/100, 707/101, 104.1; 702/186, 84; 709/224, 219; 705/10, 37
See application file for complete search history.

(56) References Cited

U.S. PATENT DOCUMENTS

| | | | |
|---|---|---|---|
| 5,892,917 A | 4/1999 | Myerson | |
| 6,470,383 B1 | 10/2002 | Leshem et al. | |
| 6,594,694 B1 * | 7/2003 | Najork et al. | 709/219 |
| 6,785,666 B1 | 8/2004 | Nareddy et al. | |
| 6,792,458 B1 | 9/2004 | Muret et al. | |
| 6,922,646 B2 * | 7/2005 | Robbins, III | 702/84 |
| 7,219,148 B2 * | 5/2007 | Rounthwaite et al. | 709/224 |
| 2002/0016731 A1 * | 2/2002 | Kupersmit | 705/10 |
| 2002/0019796 A1 * | 2/2002 | LeGraw | 705/37 |
| 2002/0147570 A1 * | 10/2002 | Kraft et al. | 702/186 |
| 2003/0131052 A1 | 7/2003 | Allan | |
| 2003/0163563 A1 * | 8/2003 | Bean | 709/224 |
| 2004/0054784 A1 | 3/2004 | Busch et al. | |
| 2005/0107985 A1 | 5/2005 | Agrawal et al. | |
| 2005/0125531 A1 | 6/2005 | Singer et al. | |
| 2006/0248116 A1 * | 11/2006 | Sobel | 707/104.1 |

FOREIGN PATENT DOCUMENTS

| | | |
|---|---|---|
| EP | 1209851 | 5/2002 |
| GB | 2367464 | 4/2002 |

OTHER PUBLICATIONS

"Clicktracks," accessed through website at http://www.clicktracks.com/features.php, Sep. 9, 2005.
"Onestat.com," accessed through website at http://www.onestat.com/html/os_enterprise.html, Sep. 9, 2005.
"Shinystat," accessed through website at http://www.shinystat.com/prodotti.html, Sep. 9, 2005.
"E-Journal User Study Report of Web Log Data Mining Dec. 2002," accessed through website at http://ejust.stanford.edu/logdata.pdf, Sep. 9, 2005.

* cited by examiner

Primary Examiner—Hung T Vy
(74) Attorney, Agent, or Firm—Shook, Hardy & Bacon L.L.P.

(57) ABSTRACT

Variable rate sampling may be used across a set of software services or for the same software service to construct a sequence of sampling sets. Users are selected over a time period using a sampling scheme to create the sampling sets. The sampling rate may change over time depending upon the underlying data that is desired, the software service that is used, and the anticipated population of users that may access the software service. The sampling sets may be combined to develop a common set for subsequent analysis to provide information regarding a total population of users.

13 Claims, 7 Drawing Sheets

VARIABLE RATE SAMPLING FOR SEQUENCE ANALYSIS

CROSS-REFERENCE TO RELATED APPLICATIONS

Not applicable

STATEMENT REGARDING FEDERALLY SPONSORED RESEARCH OR DEVELOPMENT

Not applicable.

BACKGROUND

Owners and operators of websites find it to be very useful to collect information about the users that visit their websites. Many websites provide ways for users to provide information that may be collected from them in the form of surveys. Other websites are sophisticated enough to gather information about the user without user interaction. Some websites provide a hybrid, collecting information from the user and asking the user to answer some questions.

Various reasons for collecting information from users along with various techniques to collect the information have evolved since the mid-1990s and the boom of the Internet. One of the most common forms of collecting user information has been to ask the user to fill out a survey while the user is connected to the Internet. The survey is tailored to the needs of the website provider or entity. The user would fill out the survey either from a series of questions appearing on the screen display or from another pop-up window with the survey questions. Once the user answers the questions, a button on the screen would be selected with a mouse click and the information associated with the survey disappears. What the user does not see is that the survey information would be stored at a computing device along with the survey information from other users to be analyzed according to the desires of the website provider or other entity.

Another form of collecting information would use cookies to capture information associated with the user's interaction with the website. For example, the cookie might monitor a number of times the user visits the website, track the locations visited by the user within the website, or capture activities occurring during an interaction with the website such as purchasing music from a music website. The cookies would reside on the user's computer and be specifically created to perform the gathering tasks. Such a technique might be employed by the operators of MSN® from the Microsoft Corporation of Redmond, Wash. MSN® receives billions of users at its website(s). As such, Microsoft would like to understand what kind of users interact with MSN® or what kinds of behaviors occur during the interaction. For example, a server may record a user's visit to a web page, a record may be made of an answer to a request between a client and a server, or a server might return results from a query.

The two forms of collecting information discussed above are just examples for how information might get collected. There are other ways of collecting information. And today, much of the activities of collecting and analyzing this information falls into a category called web analytics. Web analytics may be viewed as a study of the impact of a website on its users. Because of a large demand, various companies offer services to website operators for web analytics of a website.

Unfortunately, many websites (i.e. website providers) have found that collecting user information may be a monumental task. Depending upon how much information is wanted, a website might collect terabytes of information but only use a portion of it for its purposes. The fallout from collecting such a large amount of information is that resources must be provided to store the information, and the information is unwieldy in performing analyses. Many web site providers are looking for ways to gather the information they desire from users but not expend large amounts of resources to maintain the information.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, variable rate sampling for sequence analysis. The disclosure includes a solution that would allow web site providers or collectors of user information to collect a small sample of information to draw conclusions about a total set of information. The solution may provide for an answering of questions about user behavior over time, an answering of questions about the user behavior across software services, and a controlling of data accuracy due to sampling. The solution may also minimize a total volume of data to be captured and stored.

A method is provided for determining a subset of information that is representative of a total set of information that includes defining data to collect from a software service visit. Users are selected through a sampling scheme to collect the data when the users visit software services. The sampled users are organized into sampling sets. A sampling set is a subset of another sampling set. The largest sampling set is equal to a total population of users. The sampling set is determined for a software service based on either the data identified for the software service or an expectation of a number of users visiting the software service. A common set of users are determined from the sampling sets. The common set includes at least a smallest sampling set from the sampling sets, a largest common subset of user, or a set of users located in each of the sampling sets. An analysis is provided of the data associated with either the common set of users or the sampling set.

In another aspect, a method for determining a subset of information that is representative of a total set of information is provided that includes determining a set of data to collect during a transaction. A sampling percentage is determined based on either the determined set of data or an expected population of users. A subset of users is sampled during a time period to collect the set of data. The users that perform the transaction are counted. The subset of users and the collected set of data for the time period are stored. The sampling percentage is adjusted to implement a change in the set of data or a change in the transaction.

In yet another aspect, a computer system having a processor and a memory to execute a method for determining a subset of information that is representative of a total set of information is provided that includes defining data to collect when a user visits a website. Users are sampled to collect the data when the users visit websites. The users are organized into sampling sets. A sampling set is a subset of users from a total population of users. The sampling set is a subset of another sampling set. The largest sampling set is equal to the total population of users. The sampling set is determined for a website based on the data identified for the website or an expectation of a number of users visiting the website. A common set of users from the sampling sets is determined. The common set is a smallest sampling set from the sampling sets. An analysis of the data associated with the common set of users is provided.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION

The present invention will be better understood from the detailed description provided below and from the accompanying drawings of various embodiments of the invention, which describe, for example, variable rate sampling for sequence analysis. The detailed description and drawings, however, should not be read to limit the invention to the specific embodiments. Rather, these specifics are provided for explanatory purposes that help the invention to be better understood.

Exemplary Operating Environment

Figure 1:
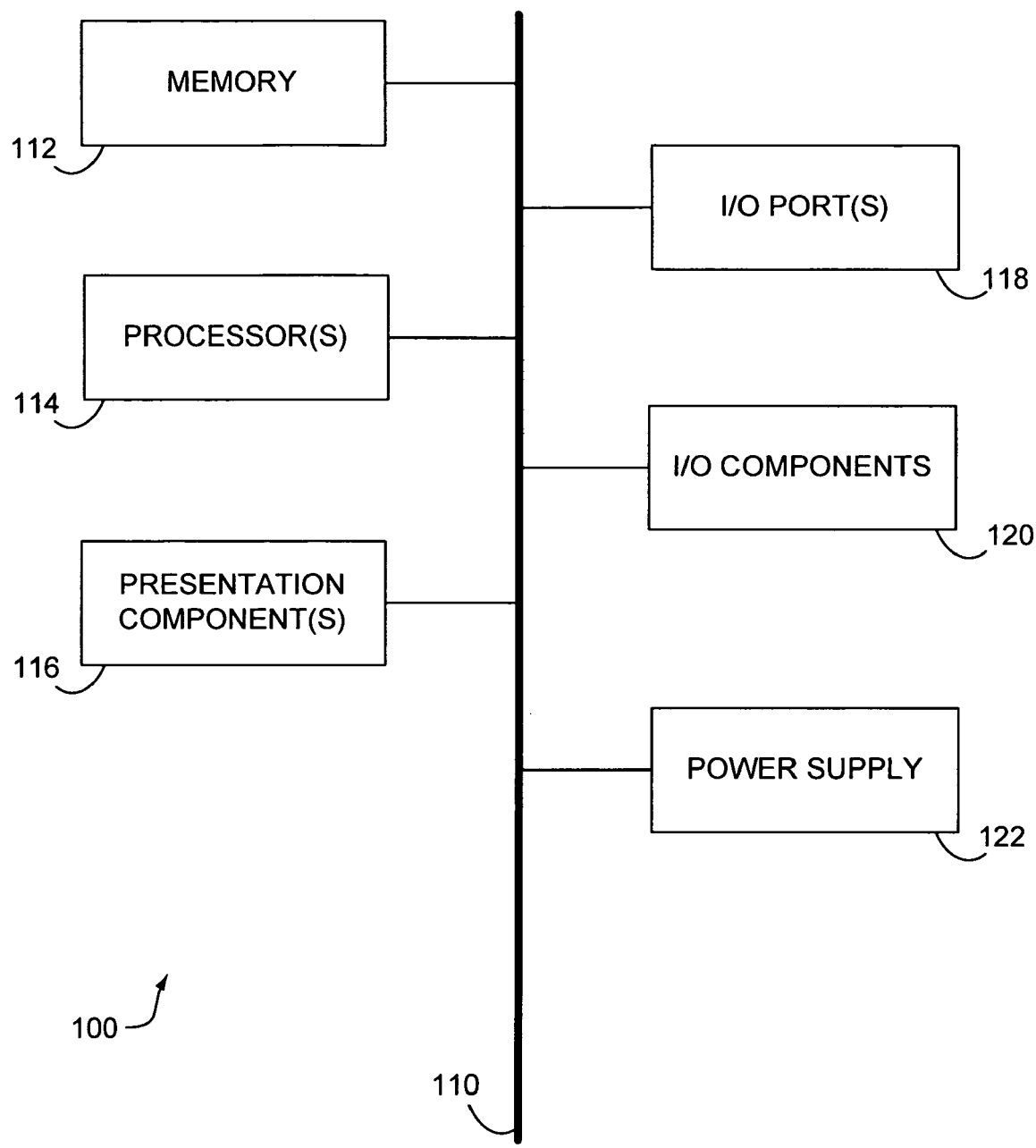
FIG. 1 is an, exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced in connection with a computing network. Although the present invention can be employed in connection with a computing-network environment, it should not be construed as limited to the exemplary applications provided here for illustrative purposes.

Variable Rate Sampling

For business purposes, a software service provider may want to understand what kind of users are accessing its network and understand the user's behavior while interacting with the network to improve the users' experience. The network may be an access to a software service or an access to a series of software services involving various computing devices. Rather than collect terabytes of information, an embodiment of the present invention may be implemented to identify a small sample of data from which an analysis may be performed and some conclusions may be drawn which represents the terabytes of information.

In the context of this discussion, a software service is any set of actions performed by a user using a computing device. The act of providing the service may be completed on the user's immediate computing device or may require some further actions performed on a computing device distinct from the computing device that the user is interacting with. For example: Software service may be "Read an article". This requires a web browser on the user's client computing device. For this service to be performed, the client computing device sends a request to a server which has the article and sends it back to the user. It is possible that the server may require querying another computing device to get the article. It is also possible that the same step may be broken into multiple steps. The server may provide only one page a time and tell the client computing device to request further pages as needed. Another example of software service is where a stock trading application that is running on a user's computing device requests a stock quote. The user may not be aware that a request was sent to the server and the communication mechanism (protocol) between the stock application and the server might be proprietary.

The users that access the network (i.e. software service(s)) may be organized into sampling sets. The manner in which the sampling sets are chosen may vary and may include criteria such as selecting every Nth user that accesses the software service. Underlying this selection may be a set of data that the software service provider wishes to collect. For example, the software service provider may operate a music website and desire to collect data such as how many users purchased music, how many users listened to a type of music, what are the ages of users that access the website, and how many users had previously visited the website before, to name a few. The types of data that may be collected is infinite and may be tailored to the desires of the software service provider. Rather than collect information based on each question, the users are selected using a sampling scheme with an understanding that the corresponding detailed information (i.e answers to the questions) may be collected by selecting at the user level.

It is possible to organize the users into a sequence of sampling sets. For example, $S_0, S_1, S_2 \ldots S_m$ where $S_0$ may denote an entire population set while $S_m$ may denote the smallest population set (i.e. a most aggressive sampling). For example, one percent (1%) sampling is more aggressive than ten percent (10%) sampling. Also, as the sampling becomes more aggressive, a subsequently created sampling set may be a subset of the prior created sampling set. Furthermore, for different actions at a software service, different sampling sets may be chosen. For example, 10% sampling may occur where users view songs while 100% sampling may occur once a user purchases a song. The 10% sampling may be included in one sampling set while the 100% sampling may be included in another sampling set.

When analyzing data sets, a situation may occur whereby the sampling sets are the same. This may occur when analyzing one software service but at different points in time. It may also occur when analyzing different software services using the same sampling rate. When either situation occurs, the sampling sets may be the same. As such, all of the records in the sampling are used when developing a common set. The common set is the same under the circumstances. Furthermore, a total population of users may be deduced from either the common subset of the sampling sets or the sampling sets by multiplying by a factor. Again, since the common set and sampling sets are the same, the factor may be the same as well. For example, if the total population is 400 and the sampling rate is 10%, the fact of ten (10) multiplied by the sampled set of 40 would provide the total population.

In many cases, several data sets may be analyzed respectively using several different sampling sets. A common set may be derived from the several different sampling set by identifying those users that are common to the sampling sets. If the sampling sets are subsets of one another, the smallest set may be used. Furthermore, the smallest set may have the most aggressive sampling of the several different sampling sets. With that being the case, the smallest set or common set may be multiplied by a factor to obtain the total population of users. An analysis may be done using the smallest sampling set to derive information for the total population of users.

As an example of the above-mentioned discussion, when analyzing two data sets that were captured with two different sampling sets, the higher level sampling set is used and the remaining records in the lower level sampling set are ignored. Stated another way, if two software services are compared with one using set $S_4$ and another using set $S_6$, only records whose set number is greater than or equal to six (6) is retained and reviewed, set $S_6$. Also, the multiplier for $S_6$ is used to calculate the total population. Remember from the discussion above, set $S_4$ is larger than set $S_6$. Also, set $S_6$ may be indicative of more aggressive sampling than set $S_4$. Therefore, the highest sampling set may be used amongst several sampling sets corresponding to different data sets to provide information related to a population of users.

Figure 2:
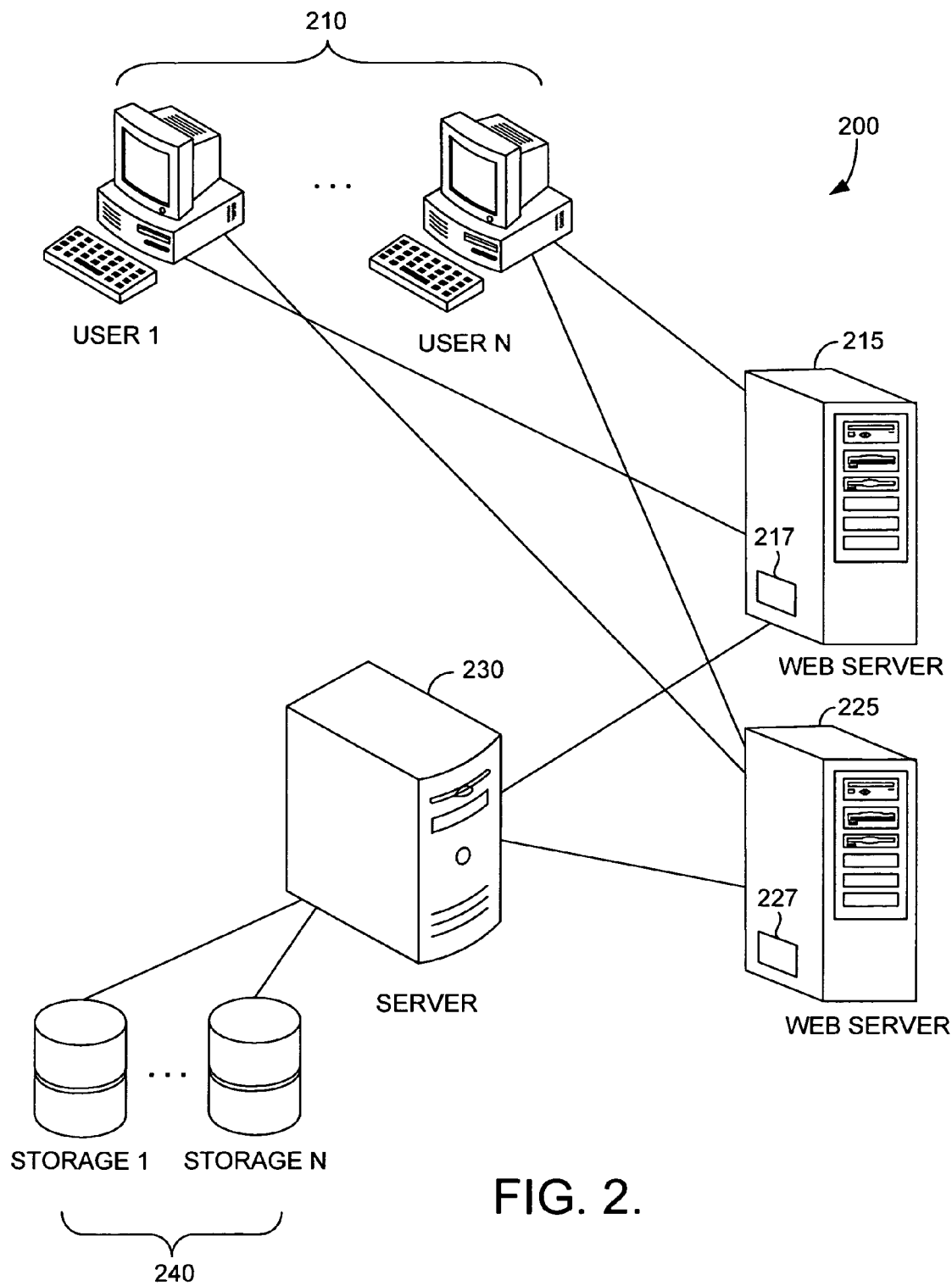
FIG. 2 is a block diagram of a variable rate sampling system suitable for practicing an embodiment of the present invention.

In FIG. 2, a block diagram of an exemplary sequence analysis environment 200 is shown. Sequence analysis environment may include a set of users 210 at computing devices that are connected to the Internet. User(s) 210 may access one or more web servers identified by web servers 215 and 225 over internet connections. Although web servers 215 and 225 are shown, other embodiments of the present invention may be implemented showing additional or less web servers. In the illustration, web servers 215 and 225 may operate a set of computer programs, identified by computer programs 217 and 227, that execute a variety of tasks such as collecting data, identifying and selecting users that access the software services, and tracking information pertaining to user accesses and behaviors. Computer programs 217 and 227 may use various methods to collect information including, but not limited to, placing cookies at user(s) 210 or providing surveys to be answered by user(s) 210. The list of functions performed by computer programs 217 and 227 is not exhaustive and may include or exclude other functions to facilitate the collection of information on users pertaining to their software service access.

Sequence analysis environment 200 may include a server 230 to collect or facilitate the collection of information created from the execution of computing programs 217 and 227. In addition, server 230 may control computer programs 217 and 227 by managing the operation of the computer programs in web servers 215 and 225, and updating the computing programs as needed. Server 230 may also hold computer programs that perform analyses on the data that is manipulated by computer programs 217 and 227, or data that is received by server 230. Information collected by server 230 may be stored in a set of storage devices 240.

A scenario will be discussed that illustrates implementing an embodiment of the present invention. User 1 of user(s) 210 may want to access a news software service, identified by web server 215, to read or obtain the news or other current event information. User 1 and User N of user(s) 210 may also want to access a music software service, identified by web server 225, to purchase and download music. A software service provider may control both web servers 215 and 225, and want to know certain data about the users that access the software services. One of the questions that the software service provider may desire to know is how many users that access the news software service also access the music software service. The software service provider may enable server 230 and computer programs 217 and 227 to sample users that access web servers 215 and 225.

provider would want users to read the advertisement on the news software service and then access the music software service. The software service provider could analyze how many users that access the news software service go to the music software service as an indicator of the effectiveness of advertising the music software service on the news software service.

Figure 3:
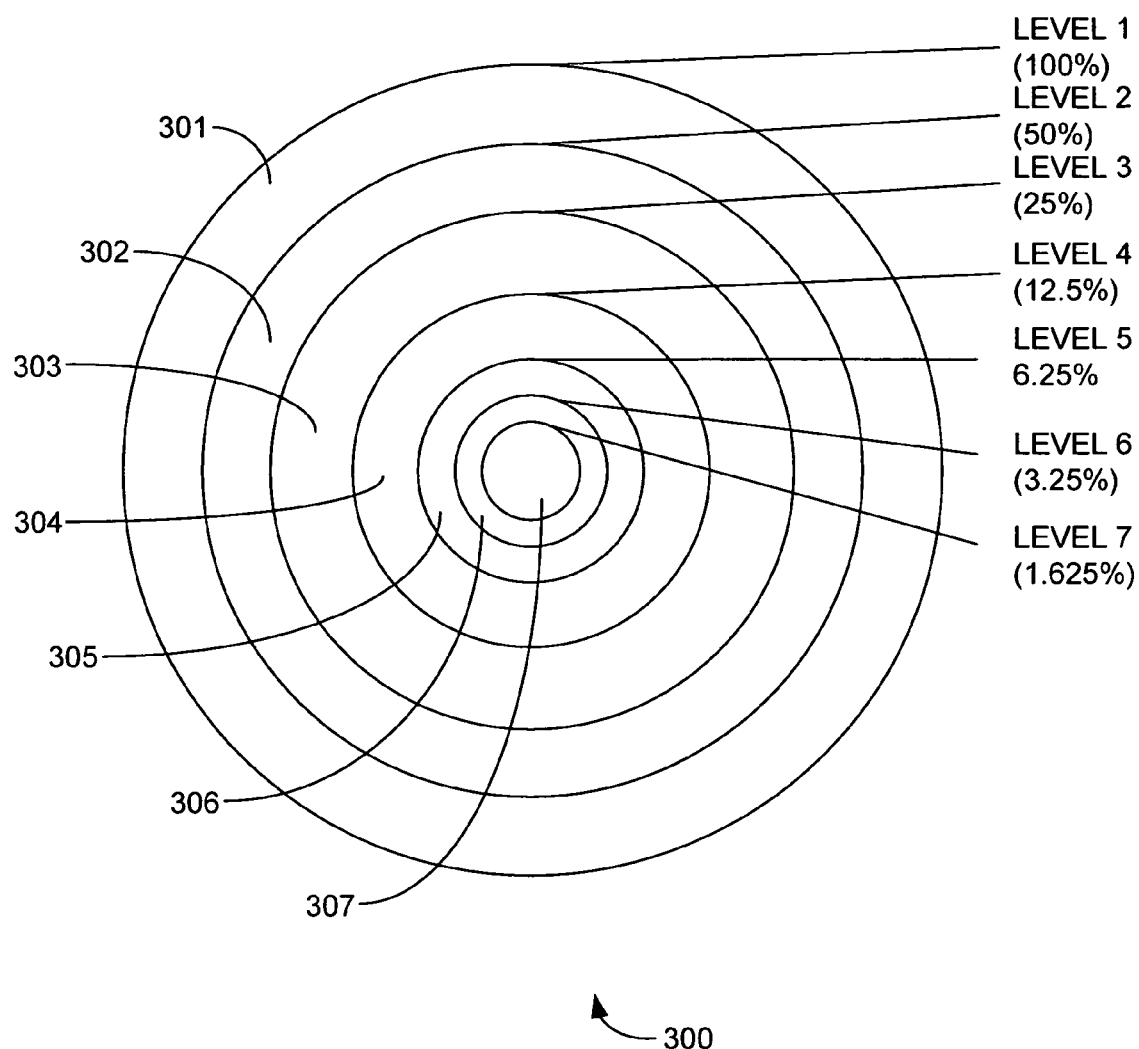
FIG. 3 is a block diagram of exemplary sampling sets created from practicing an embodiment of the present invention.

Turning now to FIG. 3, a venn diagram 300 is shown with exemplary sampling sets. One way of creating sampling sets is to say that sampling set $S_i$ may have 1 out of every $m^i$ users from i=0 to N, where m is a number greater than or equal to 2 and N is a positive integer greater than or equal to 0. $S_0$ may denote an entire population set while $m^i$ may denote a factor to multiply by set $S_i$ to obtain the entire population set. A table may be shown with details of FIG. 3 using a population set of 1000 users and a fifty percent (50%) sampling rate, meaning m=2. An additional example is shown in the table with m=5.

TABLE 1

Exemplary Variable Rate Sampling Sets
(An exemplary count of people in the sampling set.)

| | | $S_i$, i = 0 to N, N = 1000 | Sample 1 out every m, m = 2 | Factor: $m^i$, m = 2 | | $S_i$, i = 0 to N, N = 1000 | Sample 1 out every m, m = 5 | Factor: $m^i$, m = 5 |
|---|---|---|---|---|---|---|---|---|
| 301 | Level 1 (100%) | $S_0$ | 1000* | 1 | Level 1 (100%) | $S_0$ | 1000* | 1 |
| 302 | Level 2 (50%) | $S_1$ | 500 | 2 | Level 2 (20%) | $S_1$ | 200 | 5 |
| 303 | Level 3 (25%) | $S_2$ | 250 | 4 | Level 3 (4%) | $S_2$ | 40 | 25 |
| 304 | Level 4 (12.5%) | $S_3$ | 125 | 8 | Level 4 (0.8%) | $S_3$ | 8 | 125 |
| 305 | Level 5 (6.25%) | $S_4$ | 62.5 | 16 | Level 5 (0.16%) | $S_4$ | 1.6 | 625 |
| 306 | Level 6 (3.25%) | $S_5$ | 32.5 | 32 | Level 6 (0.032%) | $S_5$ | 0 | N/A |
| 307 | Level 7 (1.625%) | $S_6$ | 16.25 | 64 | Level 7 (0.0064%) | $S_6$ | 0 | N/A |

*No sampling occurs for initial sampling set since the entire population creates the sampling set.

In an example scenario, there will be two sampling sets, one sampling set correlating to web server 215 with User 1 of user(s) 210 and another sampling set correlating to web server 225 with User 1 and User N of user(s) 210. With server 230 and computer programs 217 and 227, a common set may be created from the two sampling sets whereby User 1 of user(s) 210 is in the common set. User 1 of user(s) 210 accessed both the news software service and the music software service.

As can be seen, the two sampling sets may be identified as set $S_2$ containing User 1 and set $S_1$ containing User 1 and User N. Between both sampling sets, we can use set $S_2$ as the common set based on the information discussed above. Also, a factor may be multiplied by set $S_2$ to provide a total population.

The information above may provide the software service provider with statistics as well as other behavioral information on the users that access the software services. Although there seems to not be a correlation between the software services at first glance, the software service provider may be searching for an answer to a particular issue that is not readily recognizable to everyone. For example, the software service provider could place an advertisement on the news software service regarding the availability of the music software service. This advertisement could contain a special offer that is available only for a limited time period. The software service As can be seen by Table 1, the entire population set may be obtained by multiplying the factor by the sampling set. In this case, the entire population is 1000.

FIG. 3 is indicative of the situation whereby an implementer desires to ensure that a software service that is sampled at a less aggressive rate will not miss any users that were sampled at another software service with a more aggressive sampling. One sampling set will be a subset of the other sampling set. If the analysis is to compare users that went from software service A to software service B, information may be reviewed in one of the software services that is common to both. In other words, one sampling set may contain information correlating to both software services.

Figure 4:
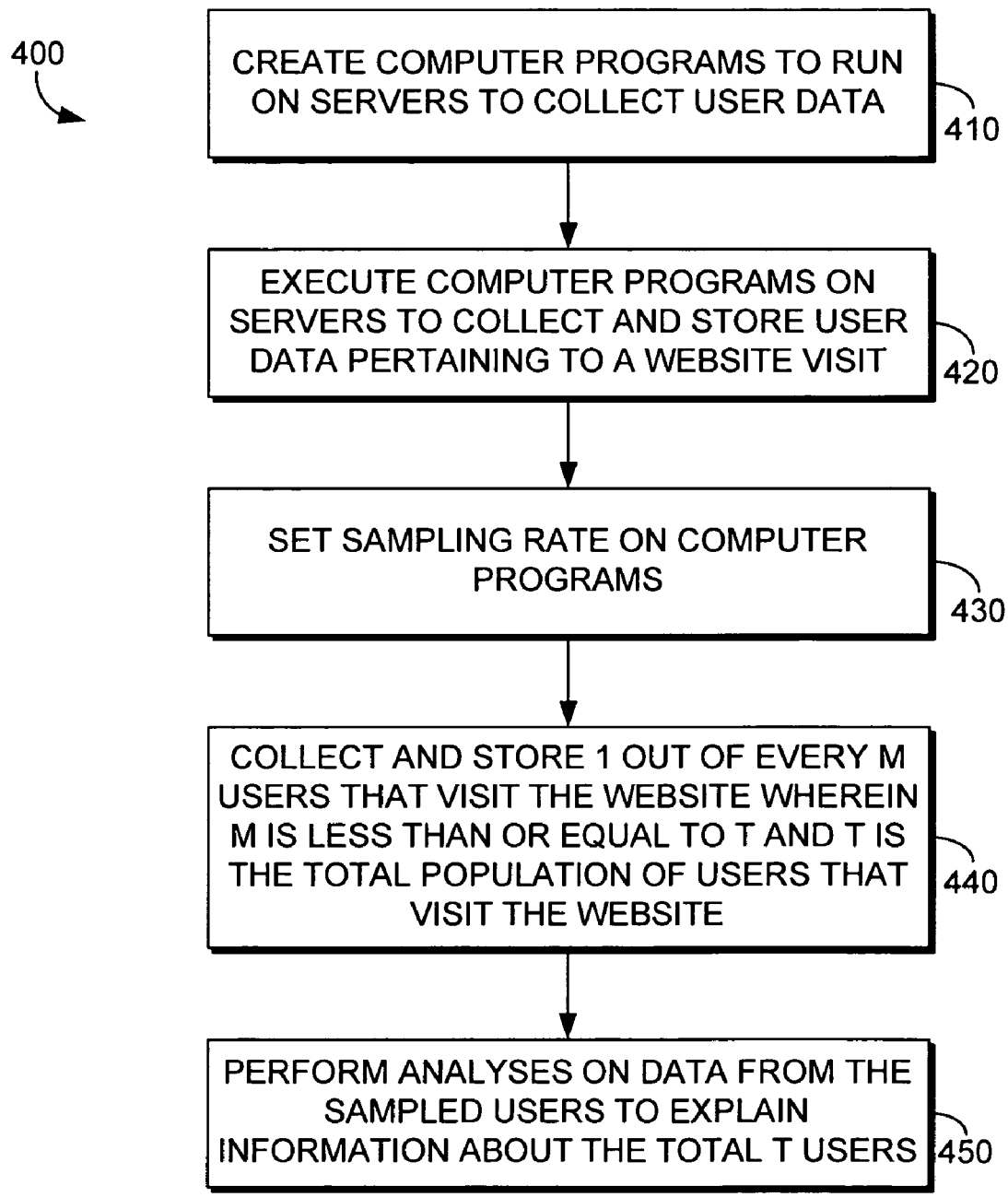
FIG. 4 is a flowchart of an exemplary process for providing a variable rate sampling when implementing an embodiment of the present invention.

In FIG. 4, a process for providing a variable rate sampling is provided in a method 400. In a step 410, computer programs 217 and 227 along with other computer programs are created to execute on web servers 215 and 225, and server 230. The computer programs are executed on web server 215 and 225 to collect and store user data pertaining to a software service access in a step 420. The user data may also be stored at storage device(s) 240 through server 230. In a step 430, a sampling rate is established to generate a sampling set using the computer programs. However, before the sampling rate is established, the sampling sets, may be pre-defined. For example, if 1% sampling is performed on two different sites, different users may be selected in the 1% sample that do not correlate to each other. Hence, the sampling sets must be defined for the two software services to enable a comparison before any sampling is done. As discussed in FIGS. 2 and 3, the computer programs collect and all users in the sampling set corresponding to the action that access the software service in a step 440 where M is less than or equal to T and T is the total population of users that access the software service. Step 440 aligns with the information in Table 1 in the discussion of FIG. 3. In a step 450, once data is collected with each user that is selected during the sampling process, analyses are performed on the data to explain information about the total number of users.

Figure 5:
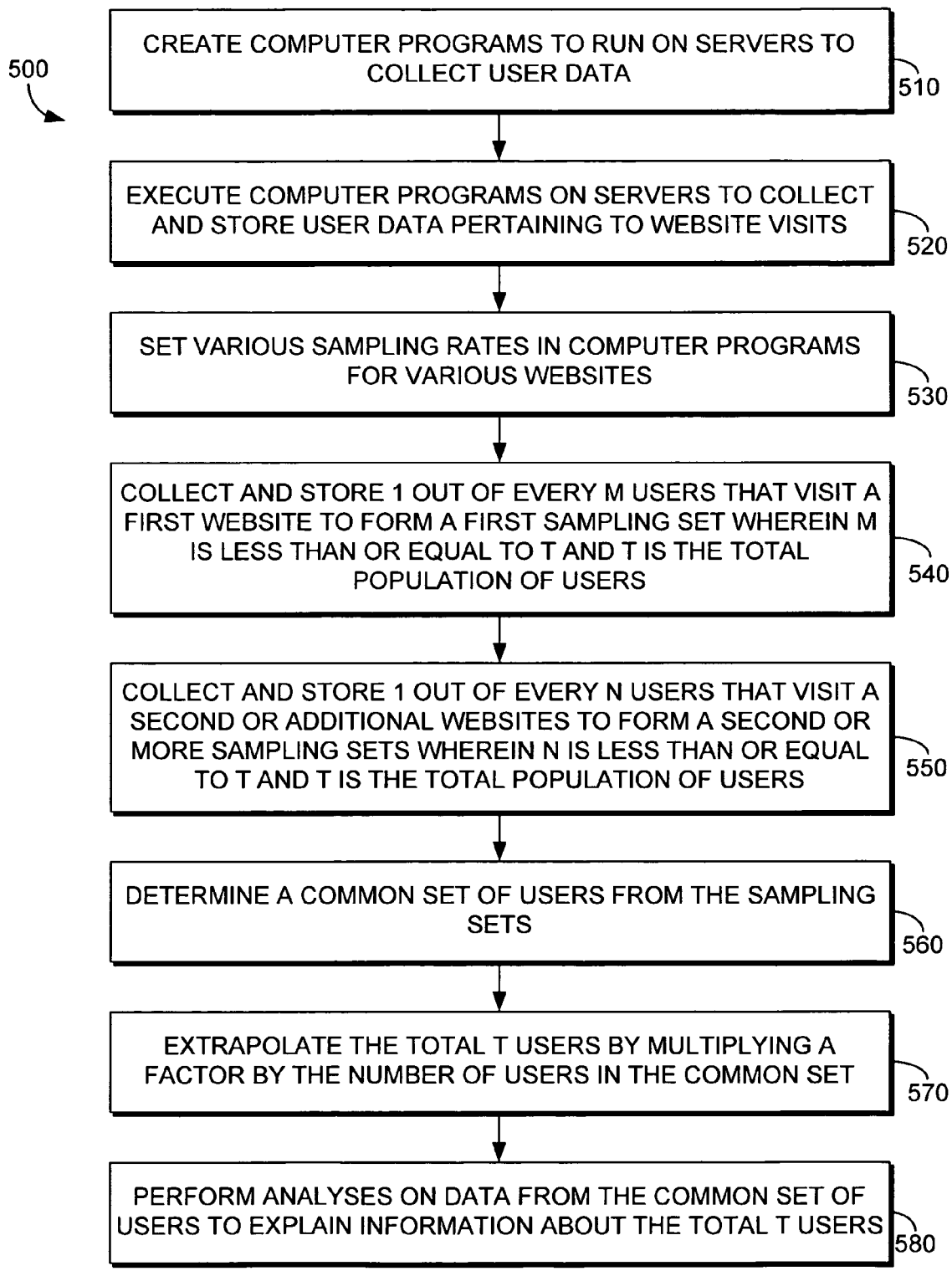
FIG. 5 is a flowchart of another exemplary process for providing a variable rate sampling when implementing an embodiment of the present invention.

Referring now to FIG. 5 another process for providing a variable rate sampling is provided in a method 500. Like steps 410 and 420, computer programs are created to run on servers to collect user data in a step 510. The computer programs are executed on the servers to collect and store user data pertaining to software service accesses in a step 520. In a step 530, different sampling rates for different software services may be established depending on the desires of the software service provider. As stated in FIG. 4, sampling sets may be defined and selected before the sampling rates are established. As discussed above, the software service provider may desire to know certain information for users that access one or more software services. The sampling rate may be established based upon an assumption or prior knowledge of the amount of users that accessed a particular software service in the past. For example, if 400 million users access a software service then the sampling rate may be set low corresponding to a high aggressive sampling. While with another software service, if 100 thousand users access the software service then the sampling rate may be set high corresponding to a low aggressive sampling. The idea here is to obtain adequate sampling sets to provide useful information about the total population. The creation and execution of the different variables that correlate to the sampling rate and the amount of sampling may be found in computer programs 217 and 227, or server 230.

Like step 440, in a step 540, all users in the sampling set corresponding to the action that access a first software service to form a first sampling set are collected and stored where M is less than or equal to T and T is the total population of users. In a step 550, a similar step to step 540 is performed for additional software services at different sampling rates. When the sampling sets are created with steps 540 and 550, a common set may be determined in a step 560. The common set may correlate to the smallest sampling set derived through the sampling efforts, especially if the sampling sets are subsets of each other.

In a step 570, the total T users may be extrapolated by multiplying a factor by the number of users in the common set. As shown in FIGS. 2 and 3, and more particularly in Table 1, the total population may be derived from the sampling rate information. However, an implementer has to determine the sampling rate for the specific information desired at the particular software service. In other words, the software service provider may need to know something about the software service in terms of the amount of users that typically access the software service in order to establish a sampling rate. For example, one may not want to sample 1 out of every 2 users over a twenty-four hour period if only 100 users access the software service in that period. However, one may want to sample 1 out of every 50 users if 1 million users access the software service during the same period. Therefore, the software service provider or an implementer may want to establish a sampling rate and a sampling period based on the information desired to be learned and an anticipated number of users to access the software service.

Figure 6:
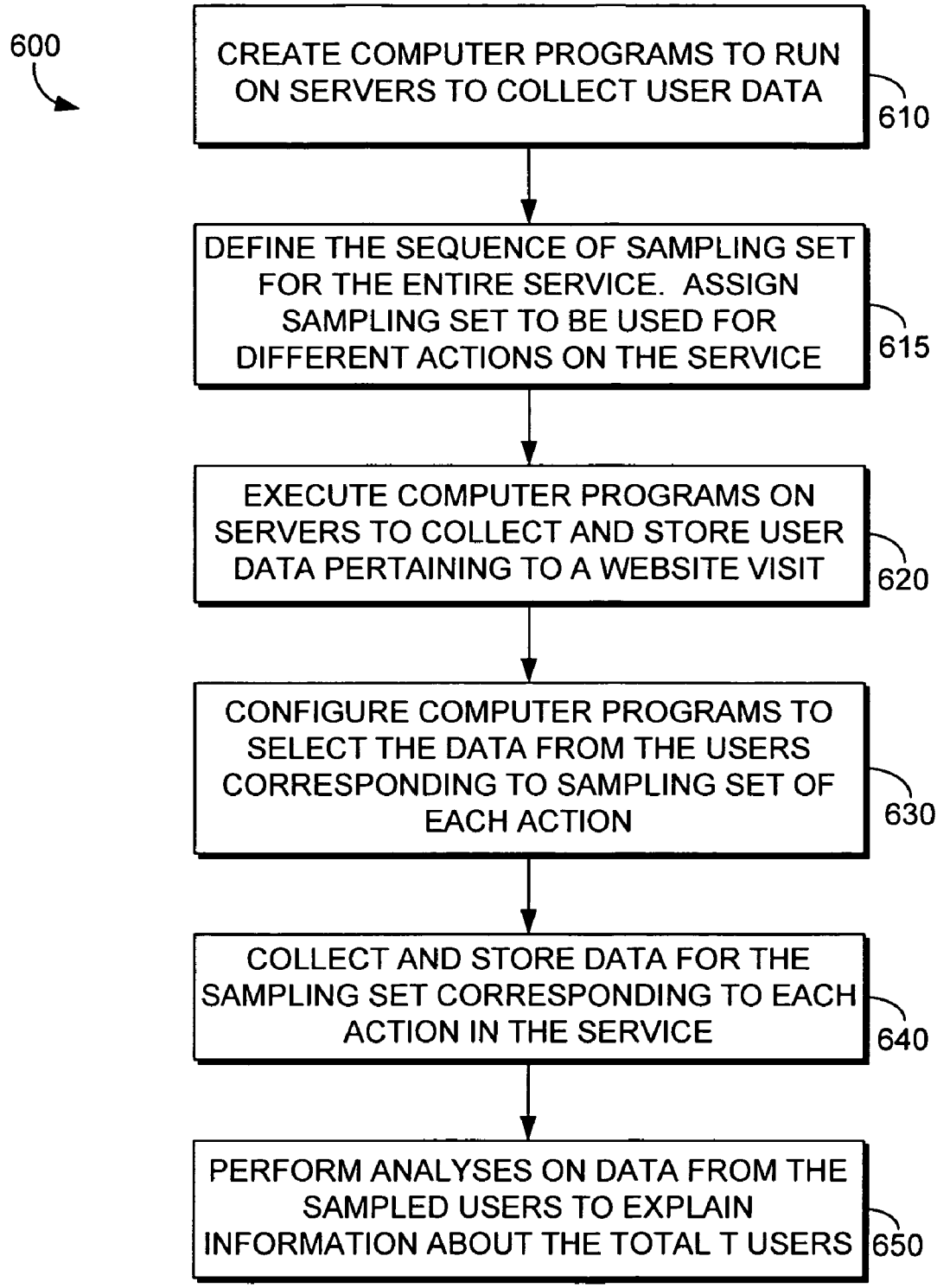
FIG. 6 is a flowchart of another exemplary process for providing a variable rate sampling when implementing an embodiment of the present invention.
Figure 7:
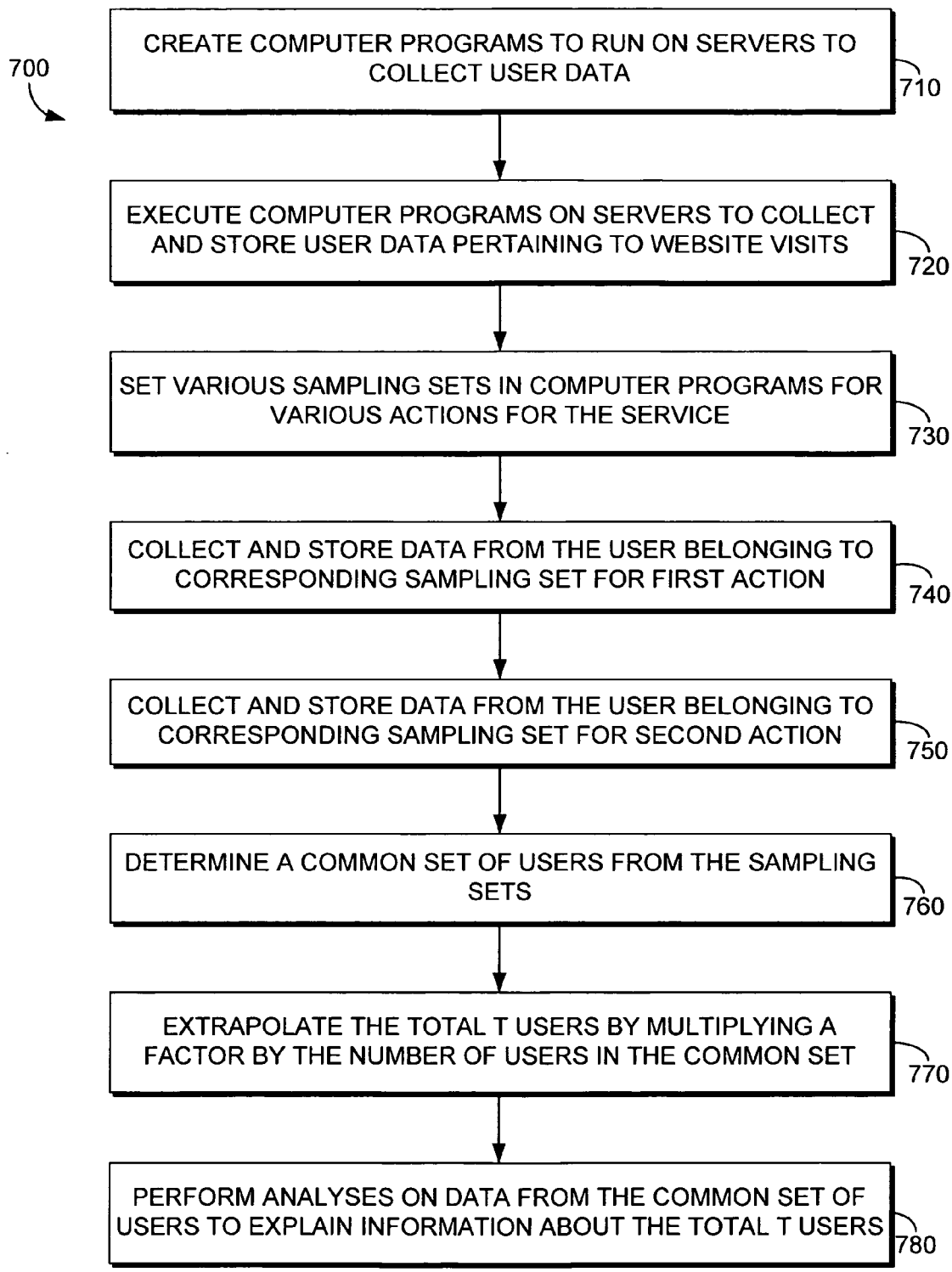
FIG. 7 is a flowchart of another exemplary process for providing a variable rate sampling when implementing an embodiment of the present invention.

Referring now to FIGS. 6 and 7, processes for providing variable rate sampling are provided respectively in methods 600 and 700. Methods 600 and 700 illustrate alternative embodiments of the present invention that may be implemented. Method 600 is similar to method 400 with the exception of several steps. In a step 615, the sequence of sampling set is defined for the entire service, and the sampling set is assigned to be used for different actions on the service. In a step 630, computer programs are configured to select data form the users corresponding to the sampling set of each action. In a step 640, data for the sampling set is collected and stored corresponding to each action in the service.

Method 700 is similar to method 500 with the exception of several steps. In a step 730, various sampling sets are set in computer programs for various actions for the service. In a step 740, data from the user that belongs to the corresponding sampling set for the first action is collected and stored. In a step 750, data from the user that belongs to the corresponding sampling set for the second action is collected and stored.

Throughout the steps above, various information may be collected and stored in a variety of places. Most common, the information may be stored in storage device(s) 240 discussed above. With storage device(s) 240 and server 230, analyses of the information from the common set of users may be performed to explain information about the total T users. From the analyses, the software service provider or implementer may draw various conclusions about the users that access the software services. These analyses may enable the software service provider or implementer to kept financial costs or resources down by not having to store or manipulate huge amounts of data. By sampling terabytes of data, a fraction of information may be retained to provide a similar conclusion on the total information. Furthermore, the fraction of information may be manipulated easier than the total information.

The prior discussion is for illustrative purposes to convey exemplary embodiments. The steps discussed in FIGS. 4, 5, 6 and 7 may be executed without regards to order. Some steps may be omitted and some steps may be executed at a different time than shown. For example, step 430 may be executed before step 420, and step 550 may be executed before step 540. The point here is to convey that the figures are merely exemplary for the embodiments of the present invention and that other embodiments may be implemented for the present invention. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention has been described herein for purposes of illustration, various modifications may be made without deviating from the spirit and scope of the invention. Accordingly, the invention is not limited except as by the appended claims.

The invention claimed is:

1. One or more computer-readable media having computer instructions stored thereon for executing a method for determining a subset of information that is representative of a total set of information, comprising:

defining a first set of data to collect from a software service access;

selecting one or more users through a sampling scheme to collect the first set of data when the one or more users access one or more software services from one or more service providers;

organizing the one or more users that are sampled into two or more sampling sets wherein a sampling set is a periodic selection of users from a total population of users, wherein a sampling set is a subset of another sampling set, and wherein a maximum size of the sampling set is equal to the total population of users;

determining the sampling set for a software service from a service provider based on the first set of data identified for the software service or based on an expectation of a number of users accessing the software service;

determining a common set of the one or more users from the one or more sampling sets wherein the common set comprises at least one of a smallest sampling set from the one or more sampling sets, a largest common subset of users, or a set of users located in each of the one or more sampling sets;

multiplying the common set by a factor to obtain the total population wherein the factor is inversely proportional to a sampling rate; and providing an analysis of the first set of data associated with the common set of the one or more users, or the one or more sampling sets.

2. The media of claim 1, wherein the one or more users that are sampled are a selection of a subset of users from the total population of users.

3. The media of claim 1, wherein the common set is selected from a group including a largest sampling set or a most aggressive sampling rate.

4. The media of claim 1, further comprising providing an identification of each user to track from a first software service to a second software service.

5. The media of claim 4, wherein the sampling set associated with the second software service is selected from the another sampling set associated with the first software service.

6. A computer system having one or more computing devices that have a processor and a memory, the computer system operates the one or more computing devices to execute a method for determining a subset of information that is representative of a total set of information wherein all steps are performed by the one or more computing devices, the method comprising:

defining a first set of data to collect when a user visits a website;

sampling one or more users to collect the first set of data when the one or more users visit one or more websites of one or more service providers;

organizing the one or more users that are sampled into two or more sampling sets wherein a sampling set is a periodic selection of users from a total population of users, wherein the sampling set is a subset of another sampling set, and wherein a maximum size of the sampling set is equal to the total population of users;

determining the sampling set for a website of a service provider based on the first set of data identified for the website or based on an expectation of a number of users visiting the website;

determining a common set of the one or more users from the one or more sampling sets wherein the common set is equal to a smallest sampling set from the one or more sampling sets;

multiplying the common set by a factor to obtain the total population wherein the factor is inversely proportional to a sampling rate; and providing an analysis of the first set of data associated with the common set of the one or more users.

7. The system of claim 6, wherein the common set is selected from a group including a largest sampling set or a most aggressive sampling rate.

8. The system of claim 6, further comprising providing an identification of each user to track from a first website to a second website.

9. The system of claim 8, wherein the sampling set associated with the second website is selected from the another sampling set associated with the first website.

10. One or more computer-readable media having computer instructions stored thereon for executing a method for determining a subset of information that is representative of a total set of information, comprising:

defining a first set of data and a second set of data to collect from a software service access;

selecting one or more users through a sampling scheme to collect the first set of data when the one or more users access a first software service from a service provider;

selecting one or more other users through another sampling scheme to collect the second set of data when the one or more other users access a second software service from the service provider;

organizing the one or more users that are sampled into a first sampling set;

organizing the one or more other users that are sampled into a second sampling set;

determining a common set from the one or more users and the one or more other users from the first sampling set and the second sampling set;

multiplying the common set by a factor to obtain the total population wherein the factor is inversely proportional to a sampling rate; and providing an analysis of the first set of data and the second set of data associated with the common set.

11. The media of claim 10, wherein the second sampling set is a subset of the first sampling set and wherein a maximum size of the first sampling set is equal to a total population of users.

12. The media of claim 10, wherein the common set is selected from a group including a largest sampling set or a most aggressive sampling rate.

13. The media of claim 12, wherein the second sampling set associated with the second software service is selected from the first sampling set associated with the first software service.

* * * * *